Figure 1:
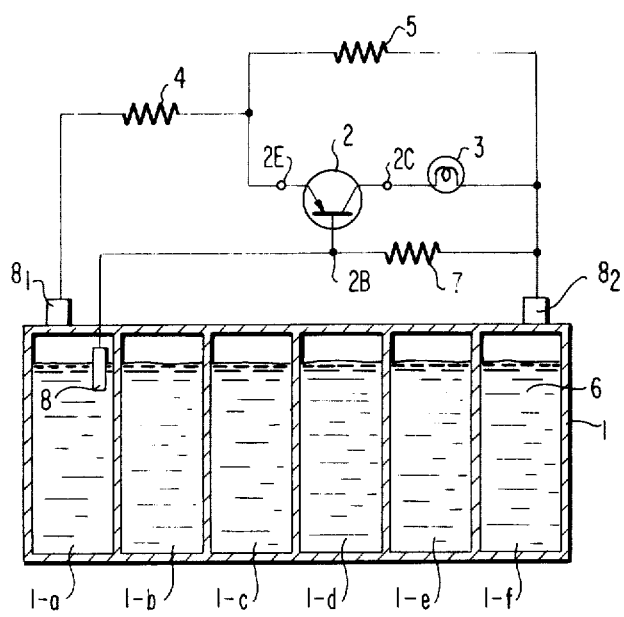

United States Patent
Muto et al.

[11] 3,891,465
[45] June 24, 1975

[54] BATTERY EQUIPPED WITH AN INDICATOR FOR THE LOWERING OF THE ELECTROLYTE LEVEL

[75] Inventors: Eiji Muto; Tsuneo Kawarabayashi; Koichi Matsumura; Hitoshi Tamura, all of Kyoto, Japan

[73] Assignee: Japan Storage Battery Co., Ltd., Kyoto-shi, Japan

[22] Filed: Aug. 16, 1973

[21] Appl. No.: 389,037

[52] U.S. Cl. .............................................. 136/182
[51] Int. Cl. ......................................... H01m 31/04
[58] Field of Search .................................... 136/182

[56] References Cited
UNITED STATES PATENTS

| | | | |
|---|---|---|---|
| 2,779,015 | 1/1957 | Walker et al. | 136/182 |
| 2,792,567 | 5/1957 | Schultz | 136/182 |
| 3,314,060 | 4/1967 | MacKenzie et al. | 136/182 |
| 3,600,234 | 8/1971 | Massie | 136/182 |

Primary Examiner—John H. Mack
Assistant Examiner—H. A. Feeley
Attorney, Agent, or Firm—Sughrue, Rothwell, Mion, Zinn and Macpeak

[57] ABSTRACT

The battery of this invention is equipped with an electrode for detecting the lowering of the level of the electrolyte. A circuit for detecting the "on and off" of the electric current is attached to the battery and actuated an alarming device in the circuit when the level of the electrolyte is lowered below the predetermined level.

Then electric power for this circuit is obtained from the battery itself through said electrode.

According to this invention, the lowering of the electrolyte level in the battery can be automatically alarmed.

3 Claims, 11 Drawing Figures

3,891,465

BATTERY EQUIPPED WITH AN INDICATOR FOR THE LOWERING OF THE ELECTROLYTE LEVEL

DETAILED EXPLANATION OF THE INVENTION

This invention relates to a battery, and more particularly to the battery equipped with an indicator for the lowering of the electrolyte level in the battery.

The level of the electrolyte in the battery is gradually lowered by the electrolysis or evaporation of water while used under the charges and discharges. If the battery is used after the level of the electrolyte is lowered, the electrode plates are emerged from the electrolyte surface and the life of the battery is much reduced.

It was a usual practice to measure the level of the electrolyte in the battery by means of a float, but the exact detection of the electrolyte level was not expected due to the vibration thereof.

On the other hand, the remote indicator capable of indicating at hand the electrolyte level in the battery has been desired to be developped.

Therefore, an object of this invention is to automate the maintenance of the battery.

Another object of this invention is to provide a device for indicating automatically the lowering of the level of the electrolyte in the battery.

Further object of this invention is to provide the indicator device capable of detecting the lowering of the electrolyte level under the vibrating condition.

Still further object of this invention is to provide the level indicator device capable of remote observation.

According to this invention; an electrode for detecting the lowering of the level of the electrolyte is provided on a battery; a circuit for detecting the "on and off" of the electric current, which is obtained from the battery through said electrode, is attached to the battery and actuates an alarming device in the circuit when the level of the electrolyte is lowering below the predetermined level.

Therefore, this invention provides a battery equipped with an electrolyte level indicator device which is characterized in that either collector electrode or emitter electrode of a transistor is connected to either anode or cathode of the battery through an alarming divice, the rest of the collector or emitter electrode of the transistor is connected to the rest of the anode or cathode of the battery, a base electrode of the transistor is connected to either the anode or the cathode through a resistor and also to an electrolyte level detecting electrode dipped in the electrolyte, and the magnitude of the emitter potential and any one of the electrodes to be connected to said resistor are selected so that the base current does not flow due to the inverse bias voltage applied on the emitter electrode when the electrolyte level detecting electrode is brought into contact with the electrolyte, whereas the base current flows due to the extinction of said inverse bias voltage when the electrolyte level detecting electrode is detached from the electrolyte, thus actuating the alarming device.

When the electrolyte level detecting electrode is dipped in the electrolyte, the potential of the electrolyte level detecting electrode, i.e., the base electrode is made almost equal to that of the emitter electrode, or the base current is inhibited to flow by applying the inverse bias voltage on the emitter electrode.

Accordingly, the alarming device is not actuated under such conditions.

On the other hand, when the electrolyte level is lowered is lowered to detach the electrolyte level detecting electrode from the electrolyte, the inverse bias voltage for the emitter electrode is extinguished to flow the base current and to actuate the alarming device.

Any of the alarming device is applicable so long as it is actuated by electric current and stimulates the sense of sight or hearing; for example the lamps or the buzzer can be used.

Now, the preferred embodiments of this invention will be described with reference to accompanied drawings, wherein, FIG. 1 is a schematic view of an example of the battery according to this invention.

Figure 2:
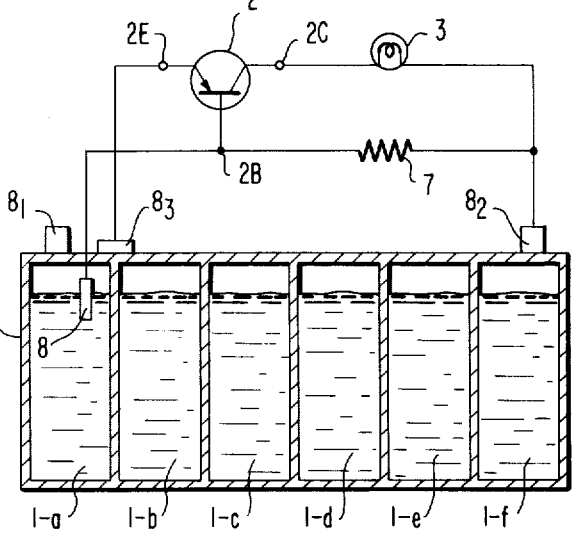
Figure 3:
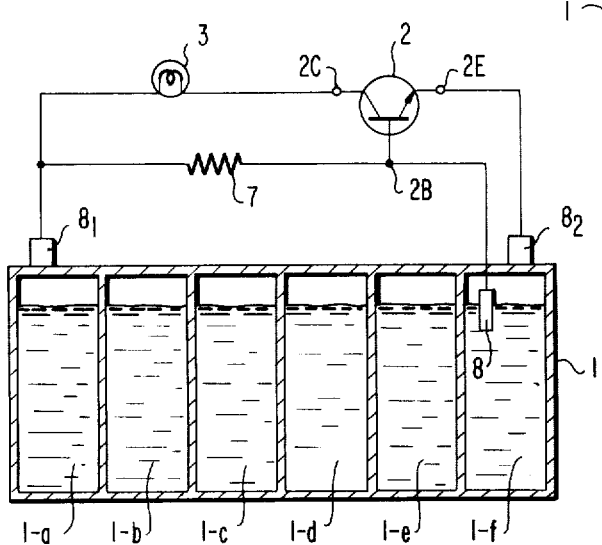
Figure 4:
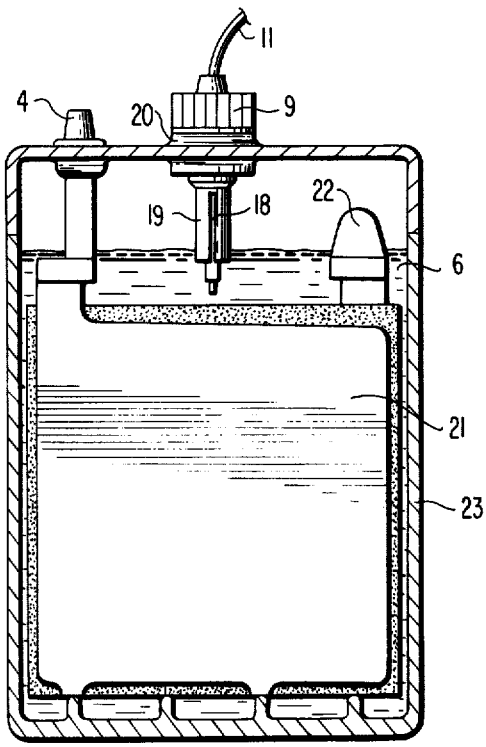
Figure 5:
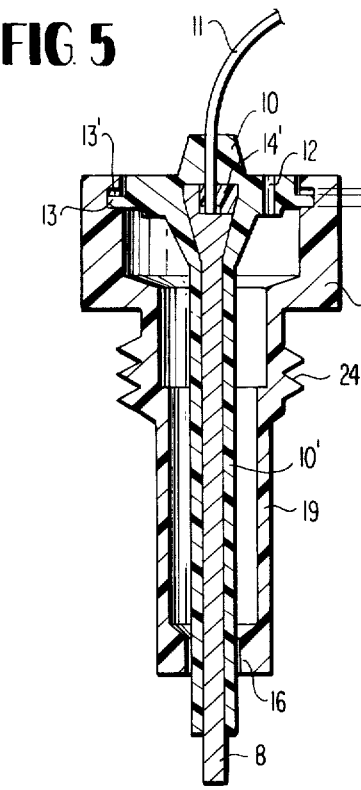
Figure 7:
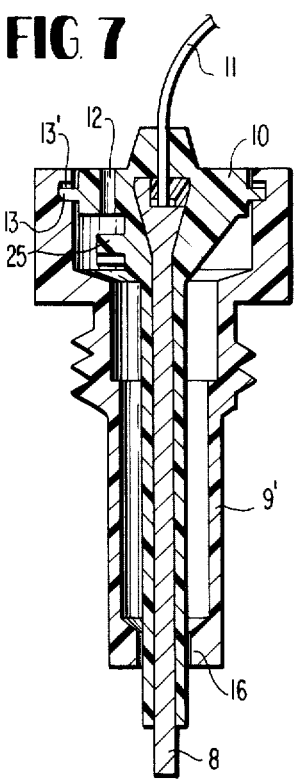
Figure 9:
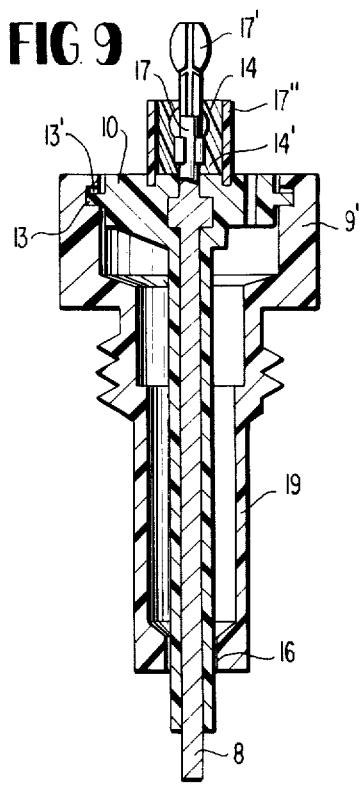
Figure 8:
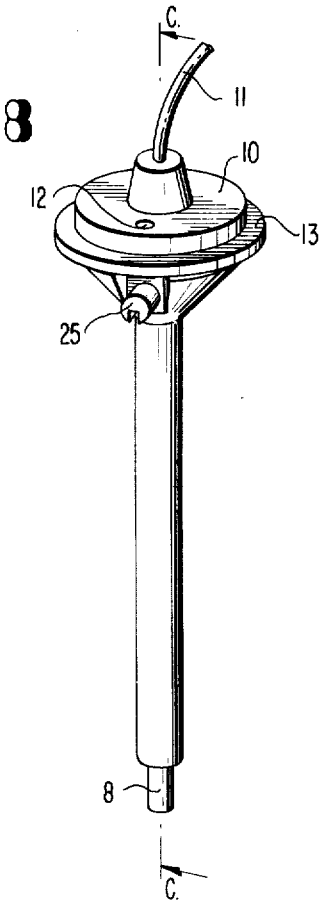

FIG. 2 is the same view as that of the FIG. 1 showing another example of the battery according to this invention, FIG. 3 is the same view as that of the FIG. 1 showing further example of the battery according to this invention, FIG. 4 is a cross sectional view of the battery equipped with a vent plug having an electrolyte level detecting electrode, FIG. 5 is a cross sectional view of the plug having the electrolyte level detecting electrode, FIG. 6 is a cross sectional view of said electrolyte level detecting electrode in the state filled with the filler material after welding to the battery, FIG. 7 is the same view as that of the FIG. 5 showing another example of the plug, FIG. 8 is a perspective view of a internal part for the plug showing the FIG. 7, and FIG. 9 is the same view as that of the FIG. 5 showing further example of the plug.

Referring to the FIG. 1 showing a battery 1 composed of six element batteries 1-a, 1-b,...,1-f connected in series, a collector electrode 2C of a PNP type transistor 2 is connected to a − terminal $8_2$ via a lamp 3. An emitter electrode 2E of the transistor 2 is connected to a + terminal $8_1$ via a resistor 4.

A resistor 5 is connected in parallel with the transistor 2 and the lamp 3. A base electrode 2B of the transistor 2 is connected to the − terminal $8_2$ via a resistor 7, and also to an electrolyte level detecting electrode 8 dipped in the element battery 1-a. The electrolyte level detecting electrode 8 is connected with the covered leading wire 11.

The transistor 2 actually used was CES name "Toshiba 2SB415"; the lamp 3 was "Toshiba luminescent diode S 8115"; the resistors 4, 5 and 7 were 220Ω, 470Ω and 2.2KΩ, respectively; and the electrolyte level detecting electrode was made from a Pb alloy. Pb alloy may be also used in case of the same electrode 8 as shown from 5 to FIG. 9.

When the electrolyte in the element battery 1-a is sufficient and the level of the electrolyte is fully high, the electrolyte level detecting electrode 8 is dipped in the electrolyte.

A voltage between the + terminal $8_1$ and the − terminal $8_2$ is 12.5V, and a voltage between the electrolyte level detecting electrode 8 and the − terminal $8_2$ i.e., the base voltage, is 11.0V. As the voltage between 1-a and the terminal 8, i.e., the emitter voltage, which is 8V, is lower than the base voltage, which is 11V, the transistor is in the cut-off state and the lamp is not lighted.

When the level of the electrolyte in the element battery 1-a is lowered and the electrolyte level detecting electrode is detached from the electrolyte surface, the voltage between the + terminal 8₁, and the − terminal 8₂ becomes 12.5V, the voltage between the 1-a and the − terminal 8₂, i.e., the emitter voltage, becomes 2.5V, and the base voltage becomes almost 0V. 45.4mA of current flows through the resistor 4, and 40 mA of current flows through the lamp 3, which is lit.

Referring to the FIG. 2, the emitter electrode 2E is connected to a terminal, for example a connecting terminal 8₃ between the element batteries 1-a and 1-b, near the − terminal 8₂ which has the potential lower than the electrolyte in the element battery 1-a to be dipped by the electrolyte level detecting electrode 8.

Referring to the FIG. 3 showing an example of the battery using a NPN type transistor, both a base electrode 2B and a collector electrode 2C are connected to the + terminal 8₁. In any of the cases, the actuation of the circuit is equal to that in the FIG. 1.

The electrolyte level detecting electrode is preferably attached to a vent plug for feeding the electrolyte in the battery so as to be dipped in the electrolyte through the plug. For this purpose, the plug proper is formed as a hollow cylinder, and a internal part including therein the lead wire of the electrolyte level detecting electrode.

A screwed or threaded zone is provided in the plug proper to fix the plug to the electrolyte filling hole of the battery.

When the internal part is not fixed to the plug proper but attached to the plug proper as capable of moving freely while twisting in the screw direction, the lead wire for the electrolyte level detecting electrode is prevented from the break during the screwing of the plug. For this purpose, the mutually engaging projection and recession are provided on the plug proper and the internal part, or the upper part of the internal part is temporarily clipped to the plug proper.

Referring to the FIG. 4, the plug 9 is screwed in the electrolyte filling hole 20 of the battery 1. Numerals 23, 21, 6, 22 and 18 indicate an electrolytic container, a group of electrode plates, electrolyte, a connecting strap for connecting the electrode plate with the neighboring electrode plate (not shown), and a slit communicating with a gas exhausting outlet on the upper part of the plug through one, respectively.

Referring to the FIG. 5 showing a cross section of the plug 9, the plug proper 9' is formed as a hollow cylinder, and a fume protecting tube 19 having a positioner 16 is built in the lower part of the hollow cylinder.

The positioner 16 serves to arrange the internal part 10 rightly on the center of the plug 9. The upper end of the plug proper 9' is opened, and a groove 13' is provided on the upper peripheral wall of the plug proper to engage the internal part 10 therewith. The width of the groove 13' is indicated by (y).

A screwed part 24 serves to fix the plug to the electrolyte filling hole of the battery. The internal part 10 cloggs the upper end of the plug proper 9', and a concave 14' is provided on the upper end of the electrolute level detecting electrode 8. The electrode 8 is first soldered to the lead wire 11 at the concave in the electrode 8, and the connected part 15 between the electrode 8 and the lead wire 11 is enveloped by filling the concave with the filler material 14 such as epoxy resin. The obtained electrolyte level detecting electrode is embedded in the internal part 10 except for the lower end. A peripheral rim 13 is formed on the internal part 10 to be engaged with the groove 13' provided at the upper peripheral wall of the plug proper 9'. The thickness (x) of said peripheral rim is made smaller than the width (y) of the groove 13'. The edge of the peripheral rim is shaped to have the sharp or round angle so that the contact area between the edge of the peripheral rim and the groove 13' is made as small as possible and both are prevented to be tightly fixed. That is to say, the internal part 10 is not tightly fixed to the plug proper 9' and rotated freely as guided by the groove 13'. Accordingly, if the plug proper 9' is twisted in the screw direction, the internal part 10 can be stood still. the tubular part 10' of the internal part 10 has the diameter slightly smaller than that formed by the positioner 16 of the fume protecting tube 19, and can be moved as not fixed by the positioner 16. Numeral 12 indicates the gas exhausting outlet.

The FIG. 6 shows the electrolyte level detecting electrode which is soldered to the lead wire 11 at the concave 14.

Figure 6A:
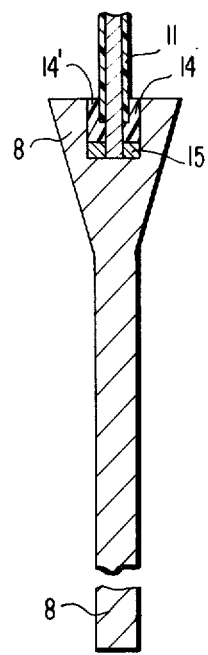
Figure 6B:
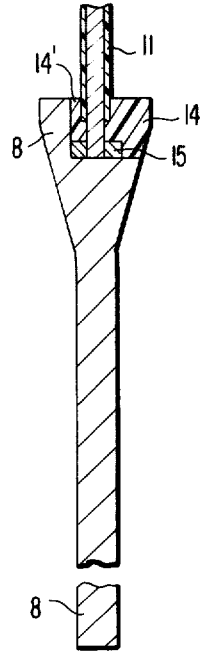
Figure 6C:
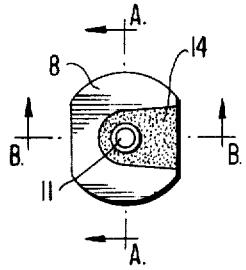

Further, FIG. 6(c) shows the place view of the said electrolyte level detecting electrode, FIG. 6(a) shows the crosssectional view taken along line A—A of FIG. 6(c), and FIG. 6(b) shows the cross-sectionsl view taken along line B—B of FIG. 6(c). Another example of the plug is shown in the FIG. 7 which shows the cross-sectional view of the internal part taken along line C—C of FIG. 8, wherein fume protecting plate 25 is attached to the internal part 10. FIG. 8 shows the perspective view of the said internal part 10. Another example of the plug is shown in the FIG. 9, wherein the upper end of the electrolyte level detecting electrode is projected over the internal part, a made split terminal 17' is attached to the projected part 17, and the connecting part between the projection 17 of the electrolyte level detecting electrode and the terminal 17' is enveloped by filler material mass 14 which is surrounded by a protecting tube 17''.

The electrolyte level detecting device having above described structure brings out following advantages;

1. As the electrolyte level is detected by a single electrode and the electric power is supplied from the battery itself, the electrolyte level detecting circuit becomes simplified. As the alarming device, such as the lamp, can be acutated reliably in response to the lowering of the electrolyte level, the checking of the battery is automatically carried out.

The detecting of the change of the electrolyte level is not so severely influenced by the change of the electrolyte temperature and the vibration of the battery, as the conventional float level indicator is not utilized. The remote observation of the electrolyte level is possible.

2. As the plug proper having the screwed part is not tightly fixed to the internal part having the electrolyte level detecting electrode, the lead wire connected to the electrode will not be broken at the joint even if the vent plug is frequently twisted for the adding of water.

3. As the joint between the electrolyte level detecting electrode and the lead wire is enveloped by epoxy resin or the like filler material, the joint is never corroded and broken even if the electrolyte comes rise to the upper part of the internal part.

As particularly described above, the battery according to this invention is suitable for the car battery which is exposed always to the vibration and plug of which is often attached to or detached from the battery for adding water.

This battery can be mass-produced with low cost. Besides, the battery is easy handling and the exchange of the electrolyte level indicator is easily carried out.

While the invention has been particularly shown and described with reference to the kpreferred embodiments thereof, it will be understood by those skilled in the art that various changes in form and details may be made therein without departing from the spirit and scope of the invention.

What is claimed is:

1. In a vent plug of a battery having an electrolyte level-detecting electrode, the improvement wherein the plug comprises: an upper hollow cap portion and a lower, vertically extending fume-protecting tube which extends into the electrolyte-containing portion of the battery, said tube containing a slot for passing gas generated within the battery through the interior of said tube to a gas vent in said cap; and an electrolyte level-sensing electrode supported in said hollow cap portion for rotation relative thereto and extending interiorly through and beyond the lower end of said tube, whereby the lower end of said electrode is in contact with the battery electrolyte when the electrolyte is at an acceptable level; so that said electrode remains stationary when the vent plug is rotated for removing it from, or inserting it in, an electrolyte filling hole of the battery.

2. The improvement as defined in claim 1 wherein said plug further comprises a support member in which said electrode is embedded except for said lower end thereof, said cap portion having a top opening for receiving said support member; said support member having a projection received in a groove in said cap portion, whereby said support member is retained within said cap portion but is free to rotate relative thereto.

3. The improvement as defined in claim 2 wherein the upper end of said electrode has a recess therein, and further comprising an external lead projecting through the top of said support member and soldered to said electrode in said recess, and filler material filling said recess.

* * * * *